US006577877B1

(12) United States Patent
Charlier et al.

(10) Patent No.: US 6,577,877 B1
(45) Date of Patent: Jun. 10, 2003

(54) WIRELESS INFRARED PERIPHERAL INTERFACE FOR A COMMUNICATION DEVICE

(75) Inventors: Michael L. Charlier, Palatine, IL (US); Thomas G. Stoll, Lake in the Hills, IL (US); Rachid M. Alameh, Schaumburg, IL (US); Michael W. Schellinger, Arlington Heights, IL (US); Thomas R. Schirtzinger, Woodstock, IL (US); Thomas E. Gitzinger, Jr., Woodstock, IL (US); Hugh K. Smith, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/510,799

(22) Filed: Feb. 23, 2000

(51) Int. Cl.$^7$ .................................................. H04B 1/38
(52) U.S. Cl. ...................... 455/557; 455/151.1; 359/127
(58) Field of Search .............................. 455/151.2, 557, 455/41, 552, 556, 569, 66; 359/145, 127, 129, 159

(56) References Cited

U.S. PATENT DOCUMENTS

| 5,033,833 A | 7/1991 | Brown | |
|---|---|---|---|
| 5,640,262 A | 6/1997 | Hanai et al. | ................. 359/195 |
| 5,737,690 A | 4/1998 | Gutman | |
| 5,929,771 A | 7/1999 | Gaskill | |
| 5,929,777 A | 7/1999 | Reynolds | ................ 340/825.49 |
| 5,978,213 A | 11/1999 | Vossler | ........................ 361/686 |
| 6,018,672 A | 1/2000 | Werbus | ........................ 455/575 |
| 6,064,502 A * | 5/2000 | Burns et al. | ................. 359/152 |
| 6,230,214 B1 * | 5/2001 | Liukkonen et al. | ............ 710/1 |
| 6,256,129 B1 * | 7/2001 | Kim et al. | .................... 359/159 |
| 6,427,078 B1 * | 7/2002 | Wilska et al. | ............... 455/550 |
| 6,504,529 B1 * | 1/2003 | Inagaki et al. | ............... 345/168 |

FOREIGN PATENT DOCUMENTS

| EP | 0849896 A3 | 6/1998 | |
|---|---|---|---|
| EP | 0917077 A2 | 5/1999 | ........... G06F/17/60 |
| GB | 2079088 A | 1/1992 | |
| WO | WO 00/04732 | 1/2000 | ............ H04Q/7/20 |

* cited by examiner

Primary Examiner—Thanh Cong Le
Assistant Examiner—Nick Corsaro
(74) Attorney, Agent, or Firm—Brian M. Mancini

(57) ABSTRACT

A wireless infrared peripheral interface for a communication device having a cellular radio transceiver includes a peripheral interface. The peripheral interface includes at least one infrared signal source and at least one infrared detector. The signal source and detector are coupled with dispersing optics. An interface circuit is coupled to the infrared signal source and detector. A processor is coupled to the interface circuit, wherein the processor controls the interface circuit to process data signals that are conveyed through the infrared source and detector so as to communicate with a peripheral device that is proximate to the communication device. The dispersing optics reduces the dependency of optical alignment between the infrared data ports of the peripheral device and communication device.

12 Claims, 4 Drawing Sheets

WIRELESS INFRARED PERIPHERAL INTERFACE FOR A COMMUNICATION DEVICE

FIELD OF THE INVENTION

The present invention relates generally to wireless communication systems. More particularly, the invention relates to a wireless infrared interface for a communication device.

BACKGROUND OF THE INVENTION

Recent trends in consumer electronics have shown an increasing demand for multi-functional portable devices that allow a user to carry a single device that facilitates and/or performs a number of tasks associated with the user's daily activities. For example, palm-top computers have become popular because they allow mobile users to access the Internet, collect and send electronic mail, carry out electronic financial transactions, update and maintain personal planners/schedules, maintain and access lists of personal contacts, keep an electronic notebook, etc. While such mobile multi-functional devices have become commonplace, particularly among business travelers, they are not easily adapted for mobile voice communication applications because they do not meet the form factor and interface requirements for a hand-held cellular phone.

As a result, many business people routinely carry a cellular phone to satisfy their needs for mobile voice communications and a separate device such as a palm-top computer to carry out a variety of daily tasks. Because a large number of people consider a personal cellular phone to be a necessity, many manufacturers have recognized that integrating additional functionality into cellular telephone products provides a way to differentiate their cellular telephone products while providing a higher value for customers. For example, some manufacturers have introduced cellular phones that include computer games, personal digital assistants, and global positioning system receivers.

Larger devices, such as computers, are too large to be integrated into a cellular telephone. In these cases, infrared (IR) coupling has been developed. Many portable devices today have IR ports for communication and synchronization between devices. However, these ports can be difficult to use because of the placement of the IR port on each device or the need for the devices and their IR ports to be in close proximity or line-of-sight in order to maintain a communication link. For instance, many people use portable laptop computers where synchronization to a communication device is accomplished with an IR interface. Unfortunately, the IR port on a computer is often located at the rear of the device which does not allow a user to interact simultaneously with both devices. This problem becomes compounded on wrist-worn cellular devices, as the user will want to wear the watch during IR data transfer which could break communications.

Thus, it would be particularly advantageous to provide a cellular communication device that could accomplish communication activities with a variety of peripheral devices apart from the cellular communication system. It would also be of benefit to provide these activities while the communication device is in motion. It would also be an advantage to reduce the dependency of optical alignment between the infrared data ports of the peripheral device and communication device.

DETAILED DESCRIPTION OF THE PREFERRED EMBODIMENTS

Figure 1:
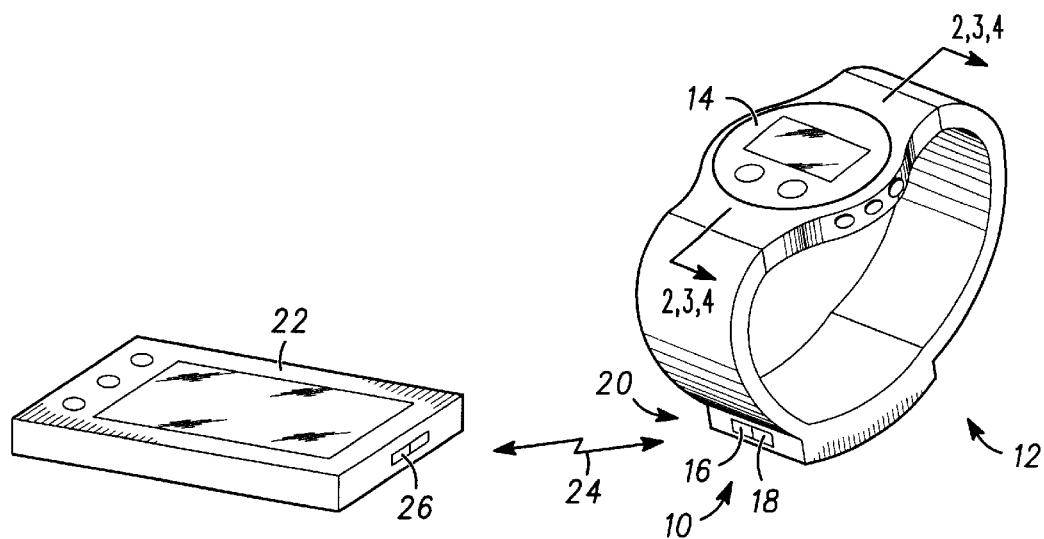
FIG. 1 is a perspective view of a wireless infrared peripheral interface for a communication device, in accordance with the invention.

The present invention provides a radio communication device that allows a user the option of hands-free communication activities with a variety of peripheral devices apart from the cellular communication system via an infrared porting scheme including an infrared peripheral interface. IR data transfer is maintained even while communication device is in motion, as the present invention reduces the dependency of optical alignment between the infrared data ports of the peripheral device and communication device.

The invention will have application apart from the preferred embodiments described herein, and the description is provided merely to illustrate and describe the invention and it should in no way be taken as limiting of the invention. While the specification concludes with claims defining the features of the invention that are regarded as novel, it is believed that the invention will be better understood from a consideration of the following description in conjunction with the drawing figures, in which like reference numerals are carried forward. A radiotelephone is a communication device that communicates information to a base station using electromagnetic waves in the radio frequency range. The radiotelephone can be strapped to, or otherwise secured to, a person's wrist, belt, or other holder.

The radiotelephone portion of the communication device is preferably a cellular radiotelephone adapted for personal communication, but may also be a pager, cordless radiotelephone, or a personal communication service (PCS) radiotelephone. The radiotelephone portion may be constructed in accordance with an analog communication standard or a digital communication standard. The radiotelephone portion generally includes a radio frequency (RF) transmitter, a RF receiver, a controller, an antenna, batteries, a duplex filter, a frequency synthesizer, a signal processor, and a user interface including at least one of a keypad, control switches, a display, and a microphone. The radiotelephone portion can also include a paging receiver. If the device incorporates a pager, there can be an additional small liquid crystal display and an audio alert. The electronics incorporated into a cellular phone, two-way radio or selective radio receiver, such as a pager, are well known in the art, and may be incorporated into the electronic unit.

FIG. 1 is a block diagram illustrating a communication device according to the invention. By way of example only, the communication device is embodied in a cellular phone having a conventional cellular radio transceiver as is known in the art (and will not be presented here for simplicity). The cellular phone, includes conventional cellular phone hardware (also not represented for simplicity) such as a user interface and a display that are integrated in a compact housing, and further includes an infrared peripheral interface, in accordance with the present invention. The principles and techniques of infrared signal modulation, coding and decoding are known in the art and will not be presented here.

The present invention is a wireless IR peripheral interface that includes at least one, and preferably two IR collection/generation devices. As will be show below these devices are coupled and oriented in a manner that is optimal for a wrist-worn communication device. The collection and generation of the IR signals is accomplished by various lens assemblies that focus/disperse the IR signals at their respective receivers and transmitters. The lenses are created using a single piece of acrylic or equivalent material that is coated to transmit, reflect and focus IR light as appropriate to enhance data transmission and maintain good signal quality. The lens assemblies can be coupled between devices by placing them in proximity or through a fiber optic link as will be explained below.

Figure 2:
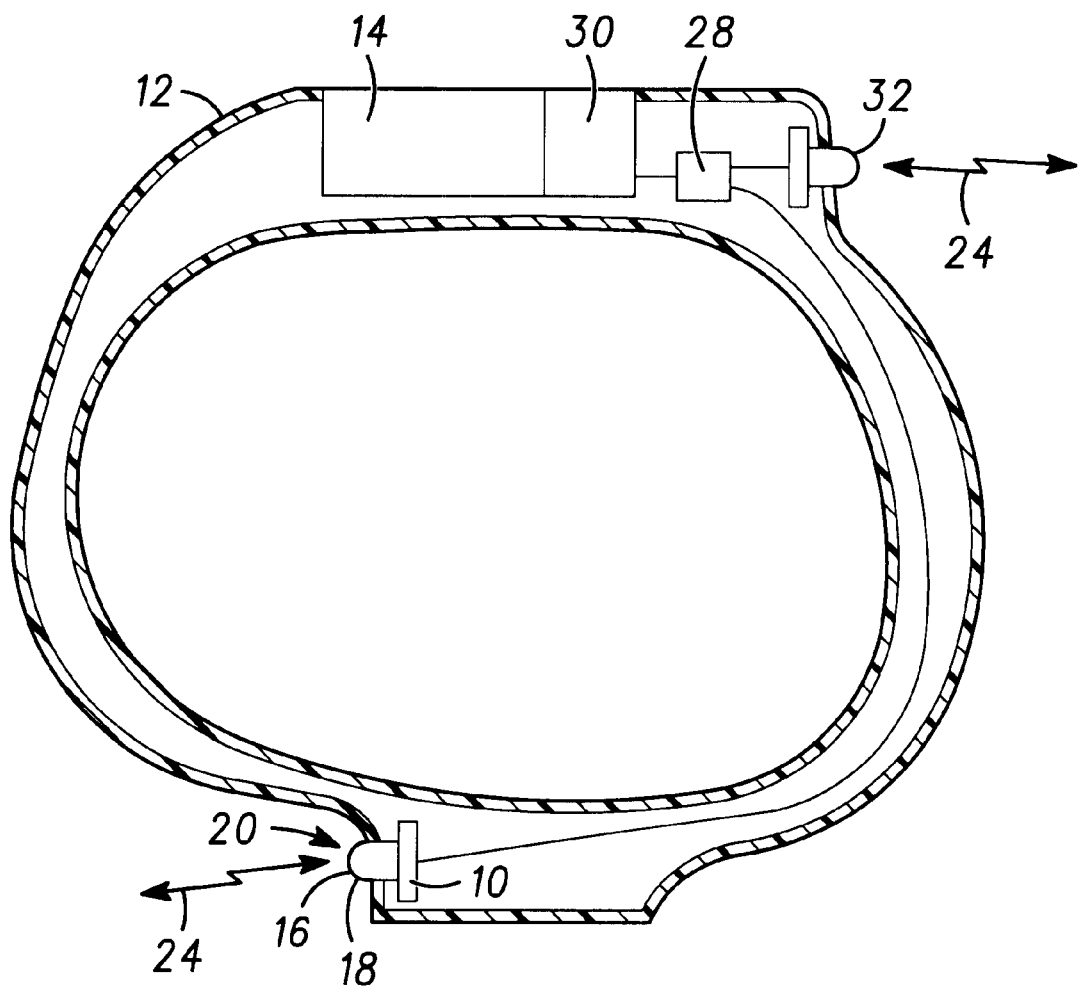
FIG. 2 is a cross-sectional view of a first embodiment of the peripheral interface in the communication device of FIG. 1.

FIGS. 1 and 2 shows a first embodiment of the present invention having a wireless infrared (IR) peripheral interface 10 for a communication device 12 having a cellular radio telephone portion 14 disposed therein. The peripheral interface 10 includes at least one infrared signal source 16 and at least one infrared detector 18. The IR signal source and detector are components that are known in the art and will not be explained here. The sources and detectors are also configured with amplification, filtering, and other electronic processing that are also known in the art for converting between IR and electrical signals. The signal source 16 and detector 18 are mechanically and optically coupled with dispersing optics 20. The dispersing optics serve to spread the infrared beam when transmitting so as to increase the opportunity for a good connection with a peripheral device 22 having its own IR interface 26, and focus IR from the peripheral device 22 so as to capture more of the signal 24 therein increasing the opportunity for a good connection with a peripheral device 22.

An interface circuit 28 is electrically coupled to the infrared signal source 16 and detector 18. The interface circuit 28 serves to modulate and demodulate the signals that are transmitted and received from the infrared source 16 and detector 18, respectively. Preferably, the interface circuit 28 includes necessary amplification and filtering. A processor 30 is electrically coupled to the interface circuit 28, wherein the processor controls the interface circuit 28 to process data signals that are conveyed through the infrared source 16 and detector 18 so as to communicate with a peripheral device 22 that is proximate to the communication device 12. In particular, the processor directs when the interface circuit transmits and gives data to the interface circuit for modulation and coupling to the infrared source for transmittal. The processor also, directs when the interface circuit receives and inputs demodulated data from the interface circuit received by the infrared detector. Although IR data transmission is typically simplex, duplex IR communication is also contemplated in the present invention. In addition, it is envisioned that the IR link can operate concurrently with the normal RF communication of the radio communication device with its base station.

In addition to providing a way to accomplish wireless data communications with local peripheral devices, the cellular phone of FIG. 1 also provides a way to establish a communication link or bridge between a conventional cellular communication system and the peripheral device. Namely, the processor controls the interface circuit to convey infrared data signals to/from the peripheral device via the infrared interface. The processor further controls the radio transceiver of the cellular phone to process auxiliary data signals that are conveyed between the cellular phone 12 and a base station as RF transmissions. In connection with the above-described communication schemes, the user can interact with the user interface of the cellular phone to request, provide, and/or monitor information that is conveyed between the cellular phone, the peripheral device, or a cellular communication system.

The wireless IR peripheral interface can be adapted to accomplish a wide variety of communication applications with a wide variety of peripheral devices. In particular, the interface circuit and the software executed by the processor are specifically configured to route and process the particular data associated with the particular type of peripheral device with which the wireless IR peripheral interface communicates. For instance, the wireless IR peripheral interface can be adapted to accomplish applications such as IR identification where, for example, the cellular phone provides keycard access to a secured location, building, room, etc. Alternatively, the peripheral interface can be adapted to accomplish remote financial transactions such as a secure-type transaction where, for example, the cellular phone provides a data link via the cellular communication system between the user's personal digital assistant containing access codes and an associated financial institution or other service provider. Still further, while the invention is described as being embodied within a cellular phone, it could alternatively be embodied in any other cellular device such as, for example, a pager.

In the specific instance of a wrist-worn communication device (without a direct fiber optic cable link), the optimum position of the IR interface is on the back of the wrist, directed toward the 6 o'clock position, to enable quick access to a PDA or laptop device, for example, that has the IR port coming out of the top or back of device. This orientation for wrist-worn devices is unique and important for a good ergonomic IR link to a peripheral device such as a PDA. Moreover, when the wrist-worn device is unclipped from a user's wrist, the orientation can be changed in various positions to direction the IR signals. For example, where the IR interface is directed towards the 6 o'clock position when wearing the device, unclipping the device can direct the IR signals to the 12 o'clock position while still allowing comfortable viewing of the display. In addition, the device can be placed on a table and rotatably position to expand IR signal coverage. In this way, a wrist-worn device is unique by allowing multiple directional coverage possibilities with a single device.

FIG. 2 also shows an alternative first embodiment wherein the dispersing optics include a plurality of lenses configured to transmit and receive infrared signals over an extended angular range. For example, an optional second pair of an infrared source and detector are contained in a second lens 32. In particular, the dispersive optics include two sets of lenses 20,32 where each lens contains a pair of the infrared signal source and detector. This second pair of source/detector/lens 32 is electrically coupled in parallel with the first set of source 16 and detector 18 to the interface circuit 28 to process and generate the same signals 24. The lenses 20,32 are oriented to provide extended viewing coverage by being oriented about 180 degrees from each other. The second IR apparatus has the advantage of providing redundancy, reduced directionality for improved IR link integrity when the communication device is moving, and a means to connect to a two or more peripheral devices.

Figure 3:
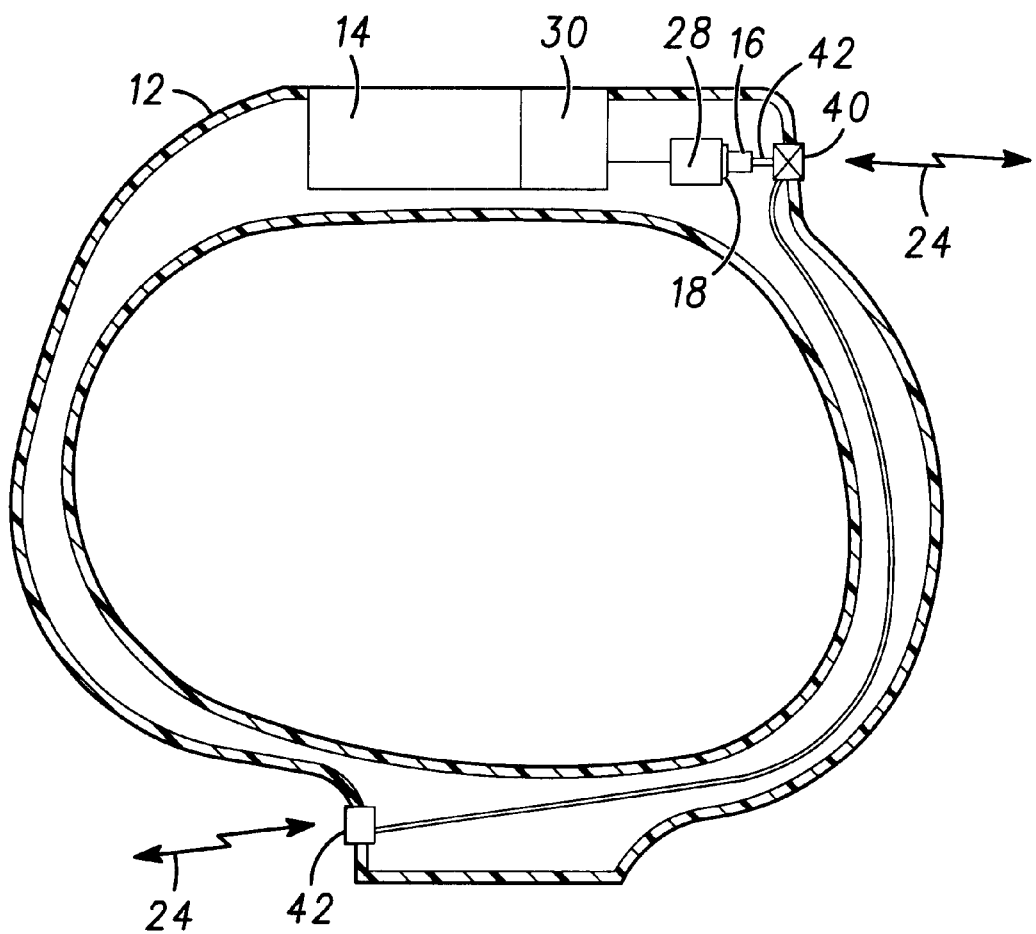
FIG. 3 is a cross-sectional view of a second embodiment of the peripheral interface in the communication device of FIG. 1.

FIG. 3 shows a second embodiment of the present invention wherein the wireless peripheral interface includes one infrared signal source 16 and one infrared detector 18. In this embodiment, the dispersive optics include a beam-splitter 40 and two sets of lenses 42. The beam splitter 40 splits and combines signals between the two lenses and the infrared signal source 16 and detector 18. The lenses 42 and beam splitter 40 are configured to provide viewing coverage about 180 degrees from each other to provide an extended angular range. This embodiment has the advantage of lower cost as the cost of a beam splitter component is less than that of two pairs of sources, detectors, filtering, and amplification. Although there is lowered sensitivity due to the split beam, this is overcome by increasing existing amplification.

Figure 4:
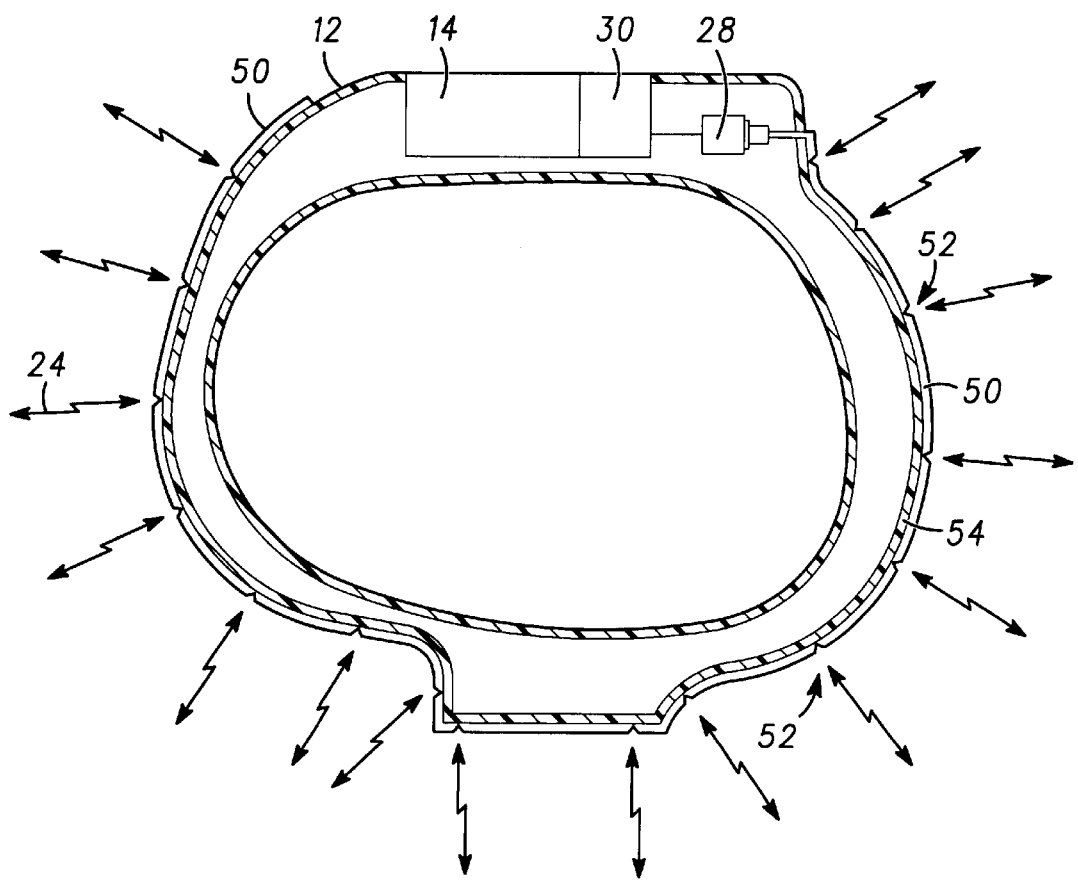
FIG. 4 is a cross-sectional view of a third embodiment of the peripheral interface in the communication device of FIG. 1.

FIG. 4 shows a third embodiment of the present invention wherein the dispersing optics include a fiber optic cable 50 disposed around a portion of a periphery of the communication device 12 so as to transmit and receive infrared signals substantially omnidirectionally around the communication device 12. In particular, the fiber optic cable 50 has notches 52 at intervals along its length to form a plurality of tiny lenses so as to admit and transmit light signals 24 at varying angles therefrom. Preferably, the communication device 12 is a wrist-worn cellular telephone having a wristband 54, and the fiber optic cable 50 is disposed around a periphery of the wristband 54 to enhance the omnidirectional effect. It should be noted that the fiber optic cable 50 and the notched 52 need not be coplanar as shown. The cable 50 can be woven into the wristband 54. A portion of the cable 50 can also be oriented in a serpentine pattern, and the notched can be oriented at different angles to enhance the omnidirectional effect. Although there is lowered sensitivity due to the multiple lenses, this is overcome by increasing the existing amplification.

Figure 5:
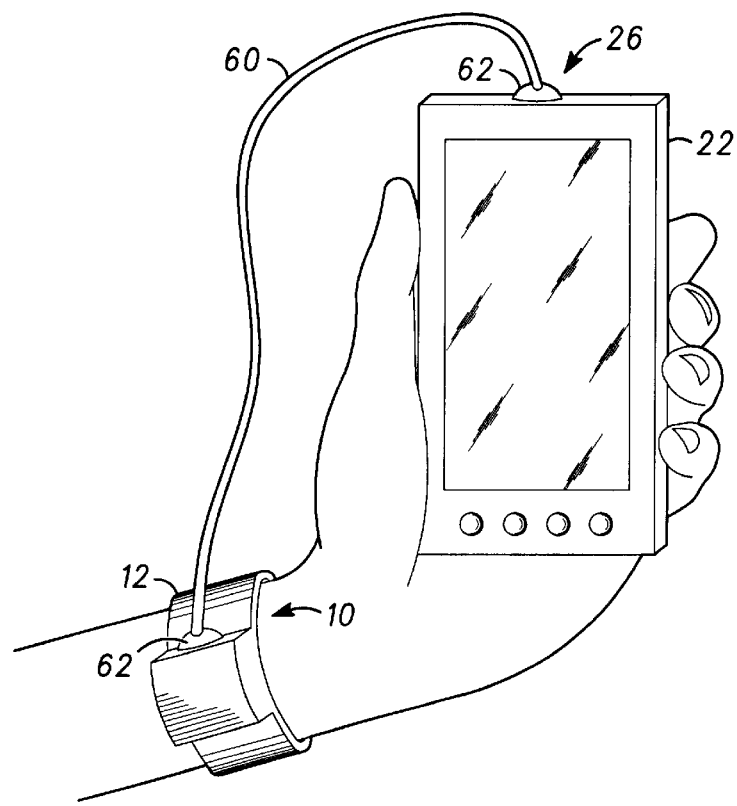
FIG. 5 is a perspective view of a fourth embodiment of the peripheral interface, in accordance with the invention.

FIG. 5 shows a fourth embodiment of the present invention which includes a fiber optic link 60 for collecting and transmitting light between the communication device 12 and a peripheral device 22. The fiber optic link 60 has two ends which are located in proximity to the interface 10 and an infrared port 26 of the communication device 12 and the peripheral device 22, respectively. Preferably, the ends of the fiber optic cable 60 have boots 62 that serve to optically align the cable in the link with the IR ports of the devices. The boots 62 also serve to reduce stray or interfering light. The dispersive optics or lenses (shown as 20 in FIGS. 1 and 2) are adapted to focus light to and from the ends of a single fiber cable in the fiber optic link 60. The lenses are created using a single piece of acrylic or equivalent material that is coated to reflect and focus IR light into fiber optics. This embodiment provides the best infrared link between the communication device and the peripheral with the least power requirement. Although FIG. 5 shows the arrangement as being hand-held, it is also envisioned that mechanical cradles or docking stations (not shown) for either or both devices with dedicated and aligned IR ports with the fiber optic link located therebetween could be utilized.

In each of the above embodiments, it is preferred that the communication device is a wrist-worn cellular telephone, which takes particular advantage in the above embodiments, as a wrist-worn device will usually be in motion, not only in a translational sense but also in a rotational sense. Therefore, means to maintain a good IR link provide particular benefit. It is also preferred that the processor conveys RF data signals associated with the infrared data signals through the cellular radio transceiver, and to further provide simultaneous IR and RF communications to enhance interoperability. Moreover, it is preferred that the processor is adapted to display information to a user via a display in accordance with at least some of the infrared data signals conveyed through the interface to increase usability and monitoring of the wireless interface of the present invention.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. A wireless infrared peripheral interface for a communication device having a cellular radio transceiver, the peripheral interface comprising:

at least one infrared signal source and at least one infrared detector, the signal source and detector coupled with dispersing optics, the dispersing optics include a fiber optic cable disposed around a portion of a periphery of the communication device so as to transmit and receive infrared signals substantially omnidirectionally around the communication device;

an interface circuit coupled to the infrared signal source and detector;

a processor coupled to the interface circuit, wherein the processor controls the interface circuit to process data signals that are conveyed through the infrared source and detector so as to communicate with a peripheral device that is proximate to the communication device.

2. The peripheral interface of claim 1, wherein the dispersing optics include a plurality of lenses configured to transmit and receive infrared signals over an extended angular range.

3. The peripheral interface of claim 1, wherein the fiber optic cable is notched at intervals along its length so as to admit and transmit light at varying angles therefrom.

4. The peripheral interface of claim 1, wherein the communication device is a wrist-worn cellular telephone having a wristband, and the fiber optic cable is disposed around a periphery of the wristband.

5. The peripheral interface of claim 1, further including a fiber optic link for collecting and transmitting light between the communication device and a peripheral device, the fiber optic link having two ends to be located in proximity to the peripheral interface and an infrared port of the peripheral device respectively, and wherein the dispersive optics are adapted to focus light onto the ends of the fiber optic link.

6. The peripheral interface of claim 1, wherein the communication device is a wrist-worn cellular telephone, and wherein the processor is further adapted to convey RF data signals associated with the infrared data signals through the cellular radio transceiver.

7. The peripheral interface of claim 1, wherein the communication device is a wrist-worn cellular telephone, and wherein the processor is adapted to display information to-a user via a display in accordance with at least some of the infrared data signals conveyed through the peripheral interface.

8. A wireless infrared peripheral interface for a communication device having a cellular radio transceiver, the peripheral interface comprising:

an infrared signal source and an infrared detector, the signal source and detector coupled with dispersing optics, the dispersive optics include a beam-splitter and two sets of lenses, the beam splitter splitting and combining optical signals through a fiber optic cable between the two lenses and the infrared signal source and detector, the lenses oriented to provide viewing coverage about 180 degrees from each other;

an interface circuit coupled to the infrared signal source and detector;

a processor coupled to the interface circuit, wherein the processor controls the interface circuit to process data signals that are conveyed through the infrared source and detector so as to communicate with a peripheral device that is proximate to the communication device.

9. The peripheral interface of claim 8, further including a fiber optic link for collecting and transmitting light between the communication device and a peripheral device, the fiber optic link having two ends to be located in proximity to the peripheral interface and an infrared port of the peripheral device respectively, and wherein the dispersive optics are adapted to focus light onto the ends of the fiber optic link.

10. The peripheral interface of claim 8, wherein the communication device is a wrist-worn cellular telephone, and wherein the processor is further adapted to convey RF data signals associated with the infrared data signals through the cellular radio transceiver.

11. The interface of claim 8, wherein the processor is adapted to display information to a user via a display in accordance with at least some of the infrared data signals conveyed through the peripheral interface.

12. A wireless infrared peripheral interface for a communication device having a wrist-worn cellular radio transceiver, the peripheral interface comprising:

an infrared signal source and an infrared detector, the signal source and detector coupled with dispersing optics, the dispersive optics include a beam-splitter and two sets of lenses, the beam splitter splitting and combining optical signals through a fiber optic cable between the two lenses and the infrared signal source and detector, one lens is located on a clasp of the wrist-worn cellular radio and another lens is located near a bezel of the wrist-worn cellular radio such that the lenses are oriented to provide viewing coverage about 180 degrees from each other;

an interface circuit coupled to the infrared signal source and detector;

a processor coupled to the interface circuit, wherein the processor controls the interface circuit to process data signals that are conveyed through the infrared source and detector so as to communicate with a peripheral device that is proximate to the communication device.

* * * * *